United States Patent [19]

Link

[11] Patent Number: 4,724,909
[45] Date of Patent: Feb. 16, 1988

[54] SCREENING BAND FOR A ROOT-CROP HARVESTER

[75] Inventor: Alfred Link, Butzbach, Fed. Rep. of Germany

[73] Assignee: A. J. Troster GmbH & Co KB, Butzbach, Fed. Rep. of Germany

[21] Appl. No.: 795,505

[22] Filed: Nov. 6, 1985

[30] Foreign Application Priority Data

Nov. 8, 1984 [DE] Fed. Rep. of Germany ....... 3440831

[51] Int. Cl.$^4$ ........................................... A01D 17/10
[52] U.S. Cl. .................................... 171/126; 198/850
[58] Field of Search ............... 171/130, 126, 117, 114; 198/846, 847, 834, 850, 728

[56] References Cited

U.S. PATENT DOCUMENTS

| | | | |
|---|---|---|---|
| 2,108,486 | 2/1938 | Hansson | 198/846 X |
| 3,129,806 | 4/1964 | Stiltner | 198/847 X |
| 3,679,050 | 7/1972 | Anderson et al. | 171/126 X |
| 4,023,671 | 5/1977 | Krämer | 198/728 |
| 4,072,062 | 2/1978 | Morling et al. | 198/834 |
| 4,449,958 | 5/1984 | Conrad | 198/834 X |

FOREIGN PATENT DOCUMENTS

| | | | |
|---|---|---|---|
| 3109209 | 11/1982 | Fed. Rep. of Germany | 171/126 |
| 3247160 | 6/1984 | Fed. Rep. of Germany | 171/126 |
| 906150 | 12/1945 | France | 198/846 |

*Primary Examiner*—Richard T. Stouffer
*Attorney, Agent, or Firm*—Wegner & Bretschneider

[57] ABSTRACT

The belts of a screening band have entrained cleats on one side, and on the other side have recesses into which crossrods are inserted. These crossrods are each connected by a rivet to the belt. The entrained cleats do not run over the entire width of the belt, but rather leave a flat region free in the middle of the belt, so that the rivets can pass there without regard to the positions of the entrained cleats.

6 Claims, 5 Drawing Figures

SCREENING BAND FOR A ROOT-CROP HARVESTER

BACKGROUND OF THE INVENTION

This invention generally relates to a root-crop harvester. More particularly, this invention relates to an endless screening band for a root-crop harvester. Still more particularly, this invention relates to an endless screening band for a root-crop harvester of the type having two lateral belts which are connected to each other by means of crossrods permanently riveted to the outside of the belts and which on the inside have uniformly-spaced, inwardly-directed entrained cleats whose purpose is to engage entrainer disks which deflect into the screening band. Such a screening band is described, for example, in German Offenlegungsschrift No. 31 09 209 (which is embodied herein by reference).

FIG. 5 shows a root-crop harvester of the type disclosed in the aforementioned German Offenlegungsschrift No. 31 09 209. The root-crop harvester of FIG. 5 includes an endless screening band 19 having endless lateral belts 1 and a deflection roller 20 having entraining disks 21 on each end. As is shown in FIG. 5, ridges 22 on entrainer disks 21 engage cleats 14, 15, and 16 to thereby cause movement of screening band 19.

Endless circulating screening bands of this type are used especially in potato harvesters. They take the earth consisting of soil and potatoes from the ground, screen out the soil and small stones included in it, and convey the potatoes together with the potato greens or haulm, into the harvester. Deflection rollers which are elastic in accordance with the aforementioned German Offenlegungsschrift No. 31 09 209 are used for the rearward deflection. The rear deflection roller has, on both sides, an entrainer disk which, with ridges, is capable of gripping between the entrained cleats of each belt, thereby entraining the screening band in a positive manner.

To be able to rivet the crossrods to the belts, the rivet holes must pass through the belts between two entrained cleats. Hence, the crossrods are located above the gaps between the entrained cleats or else above every second or multiple gap between the entrained cleats. In any case, the spacing of the crossrods can only correspond exactly to the spacing of the entrained cleats or to a multiple thereof.

Different harvesting conditions, caused particularly by especially moist or dry weather periods, make it necessary to replace the screening band by one having a crossrod spacing which no longer corresponds to the spacing of the entrained cleats. Then it becomes necessary also to replace the entrainer disks in addition to the screening band. This often requires quite a lot of work, since the entrainer disks usually have poor accessibility and may be difficult to detach owing to encrusted dirt or corrosion.

To obviate the need for this replacement of the entrainer disks, the cited German Offenlegungsschrift advocates using screening bands with belts that are flat on the inside, so that the drive force is transmitted solely by frictional engagement. This makes entrainer disks superfluous, so that a changing of the screening band can proceed more quickly, but it often happens that the screening band is not entrained by the driving roller or that a steady slip occurs between the screening band and the driving roller. Hence, the positive coupling between the screening band and the driving roller is not dispensed with in practice.

SUMMARY OF THE INVENTION

It is an object of the invention to develop a screening band of the aforementioned type whose crossrod spacing can be selected independently of the spacing of the entrained cleats.

This object is achieved according to the invention in that the entrained cleats run only over a subregion of the width of each belt, and the rivets are passed through a flat region of the belt having no entrained cleats throughout the entire length of the screening band.

Due to this configuration of the screening band according to the invention, the entrained cleats never interfere with the passage of the rivet holes. The spacing of the crossrods can therefore be selected without reference to the spacing of the entrained cleats. Hence, screening bands with different crossrod spacing can have an always identical spacing of the entrained cleats, so that the screening bands can be replaced without it being necessary also to replace the entrainer disks.

In a preferred embodiment of the invention the entrained cleats are provided on both sides of the belt, and the flat region of the belt having the rivets passes between the entrained cleats. In this embodiment each belt is engaged with the entrainer disk on both sides with its entrained cleats, so that no twisting can occur.

It is especially preferred to insert the crossrods on the outside of the belt into belt recesses flushly bordering them. These recesses hold the crossrods fixed in the longitudinal direction of the screening band, so that the rivets need only transmit small forces. Then is suffices to provide only one rivet at each crossrod end, so that the flat region between the entrained cleats can be narrow.

An alternative embodiment which makes possible a riveting with two rivets comprises locating the entrained cleats in the middle of the belt and providing a flat region of the belt having the rivets on both sides thereof.

It is also preferred to provide the top of the belt with crossribs between the crossrods. That makes is possible for goods lying on the belt to be conveyed reliably.

BRIEF DESCRIPTION OF THE DRAWING

The invention will be better understood, and objects other than those set forth above, will become apparent, when consideration is given to the following detailed description thereof. Such description makes reference to the annexed drawing wherein the single figure is a schematic section of a lens support according to the invention.

DETAILED DESCRIPTION OF THE PREFERRED EMBODIMENTS

Figure 1:
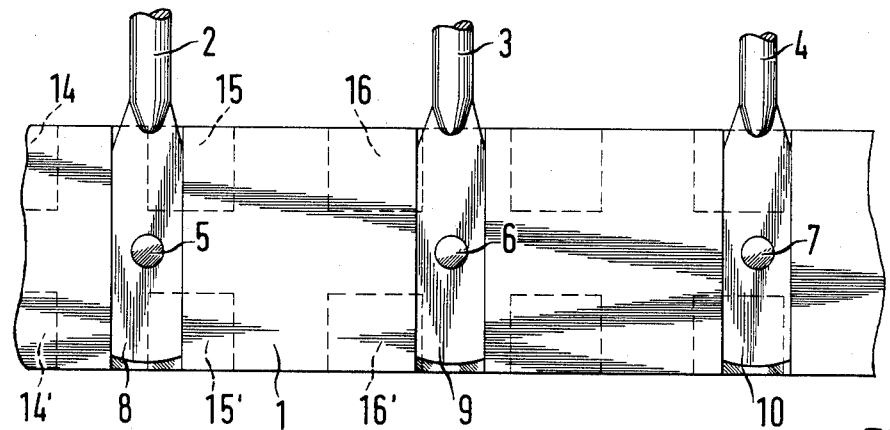
FIG. 1 is a plan view of a subregion of a screening band formed according to the invention.
Figure 2:
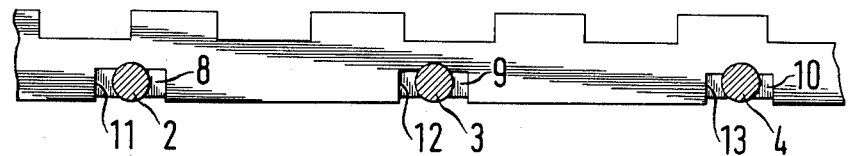
FIG. 2 is a fragmentary elevational view of one belt of the screening band, seen from the middle of the screening band.

FIG. 1 shows, for a screening band, a part of one endless belt 1 on which crossrods 2, 3, and 4 are each fastened from above by means of corresponding rivets 5, 6, and 7 passing through the belt 1. As can be seen in FIG. 2, the crossrods 2, 3, and 4 each sit with a corresponding flat endpiece 8, 9, and 10 disposed flush in a corresponding recess 11, 12, and 13 of the belt 1.

Figure 3:
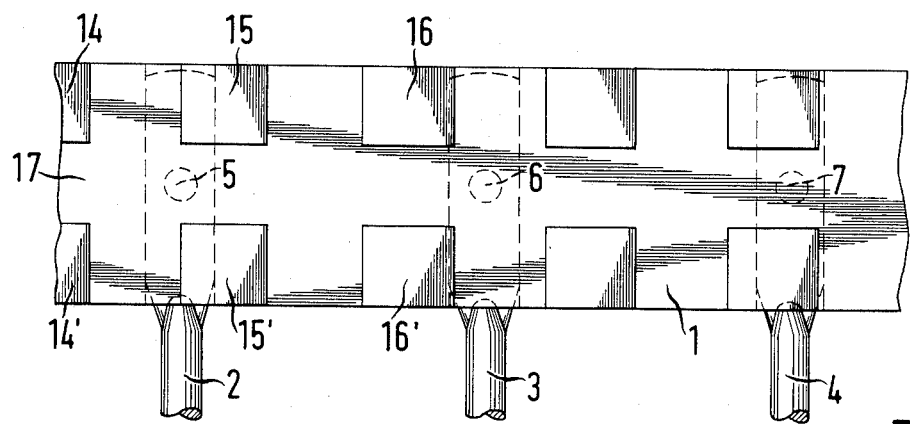
FIG. 3 is a bottom view of a subregion of the screening band of FIGS. 1 and 2.
Figure 5:
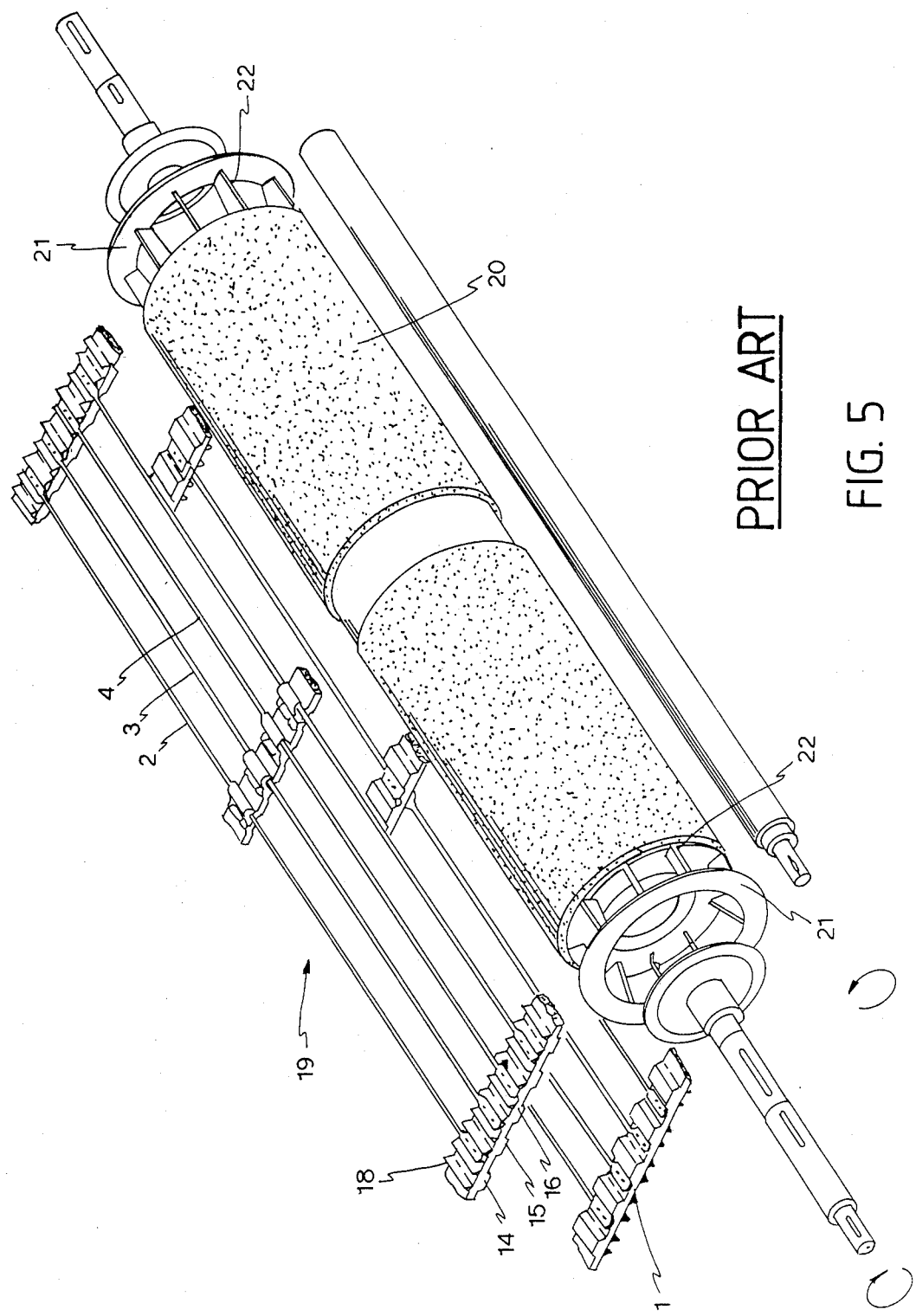
FIG. 5 is a view of an endless screening band engaged with a deflection roller for a root-crop harvester.

On the side of belt 1 opposite the side at which crossrods 2, 3 and 4 are attached belt 1 has entrained cleats, e.g., the entrained cleats 14, 15, and 16; 14', 15', and 16', into which an entrainer disk 21, shown in FIG. 5, is able to grip. A look at FIG. 3 shows that the entrained cleats 14, 14'; 15, 15', and 16, 16' are arranged in pairs on both sides of the belt 1 in such a manner that throughout the entire length of the belt 1 in the middle between the entrained cleats 14, 14', 15, 15', and 16, 16' there remains a belt region 17 through which the rivets 5, 6, and 7 are passed. Hence, the spacing of the crossrods 2, 3, and 4 can be selected completely independently of the spacing of the entrained cleats 14, 15, 16; 14', 15', and 16', since they do not interfere with the rivets 5, 6, and 7.

Figure 4:
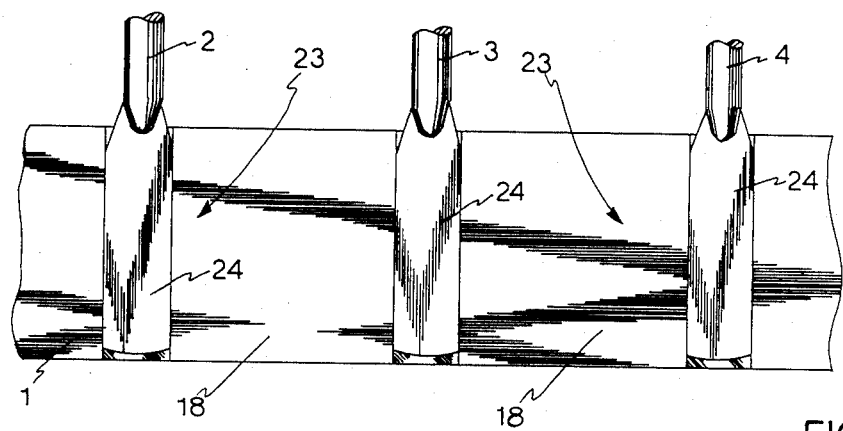
FIG. 4 is a plan view of a subregion of a screening band formed according to an alternate embodiment of the invention.

Alternatively, the entrained cleats can be located in the middle of the belt. As shown in FIG. 4, the cleats can be located in the region that is generally designated 23. In this embodiment, the rivets are located on both sides of the cleats, in the flat regions, which are generally designated 24.

The top of the belt 1 can be provided with crossribs between the crossrods, so that goods lying on the belt 1 can be better conveyed. As shown in FIG. 4, the crossribs can be provided in the area designated 18, in between crossrods 2, 3, and 4.

It should now be apparent that the objects initially set forth at the outset to this specification have been successfully achieved. Moreover, while there is shown and described present preferred embodiments of the invention, it is to be distinctly understood that the invention is not limited thereto, but may be otherwise variously embodied and practiced within the scope of the following claims.

What is claimed is:

1. An endless screening band for a root-crop harvester comprising:
   two lateral endless belts;
   a plurality of crossrods for connecting said belts;
   a plurality of attaching means attaching said crossrods to the outside surface of said belts; and
   a plurality of cleats on the inside surface of said belts for engaging entrainer disks of said root-crop harvester,
   wherein said cleats run over a subregion of the width and length of said belts and said attaching means pass through a flat region of the belts having no cleats, and
   at least one of said crossrods overlaps one of said cleats.

2. The endless screening band of claim 1 wherein said cleats are provided on both sides on the inside surface of said belts and said flat region of the belts is located between said cleats on the inside surface of said belts.

3. The endless screening band of claim 1 wherein said cleats are located in the middle on the inside surface of said belts and said flat region of the belts is located on both sides of said cleats on the inside surface of said belts.

4. The endless screening band of claim 1 wherein recesses are formed on the outside surface of said belt into which said crossrods are inserted.

5. The endless screening band of claim 1 wherein said attaching means are rivets.

6. The endless screening band of claim 1 further comprising:
   a plurality of crossribs on the outside surface of the belts between said crossrods so that goods on the belts can be better conveyed.

* * * * *